G. A. GOODSON.
CAMERA.
APPLICATION FILED SEPT. 23, 1916.
1,241,843.
Patented Oct. 2, 1917.
2 SHEETS—SHEET 1.
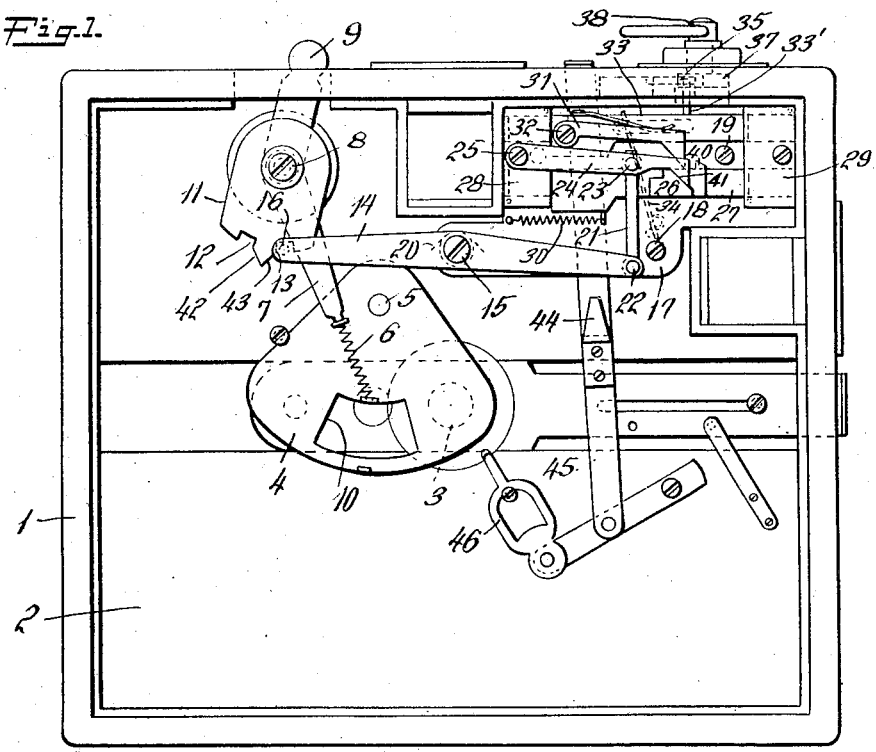
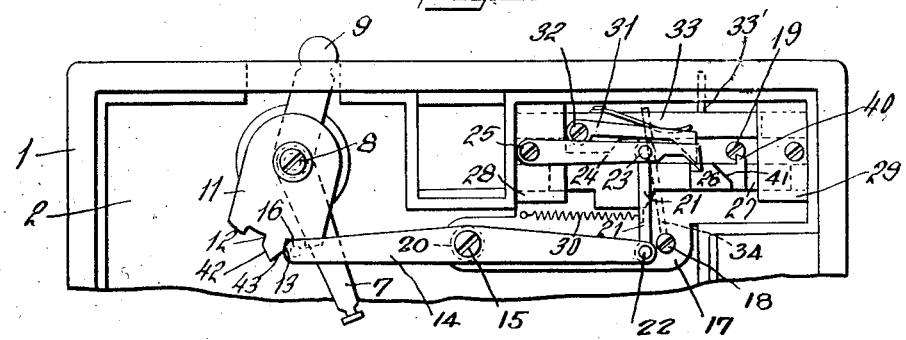
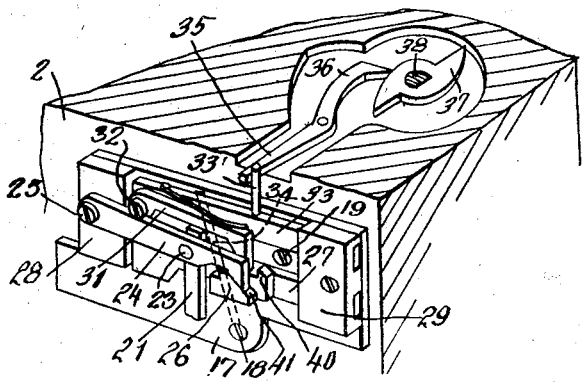
INVENTOR
GEORGE A. GOODSON.
BY
Pennie Davis + Marvin
ATTORNEYS G. A. GOODSON.
CAMERA.
APPLICATION FILED SEPT. 23, 1916.
1,241,843.
Patented Oct. 2, 1917.
2 SHEETS—SHEET 2.
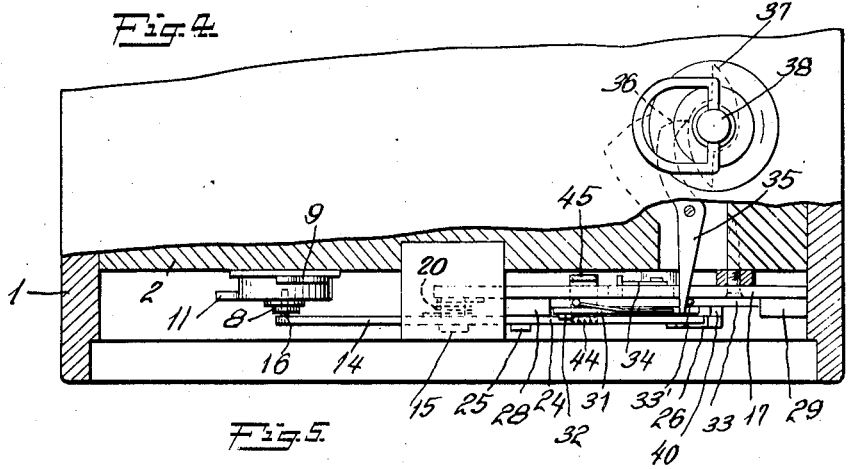
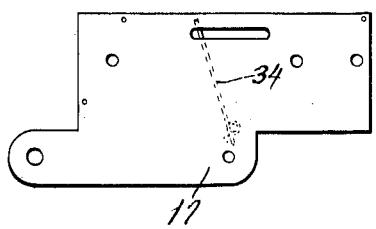
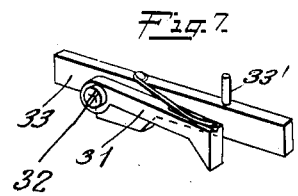
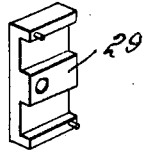
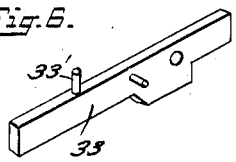
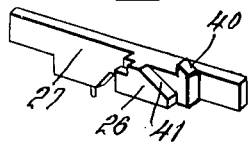
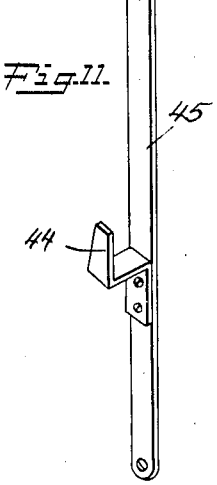
INVENTOR
GEORGE A. GOODSON.
by Pennie Davis - Marvin
ATTORNEYS

UNITED STATES PATENT OFFICE.

GEORGE A. GOODSON, OF NEW YORK, N. Y.

CAMERA.

1,241,843.   Specification of Letters Patent.   Patented Oct. 2, 1917.

Application filed September 23, 1916. Serial No. 121,726.

*To all whom it may concern:*

Be it known that I, GEORGE A. GOODSON, a citizen of Canada, residing in the city, county, and State of New York, have invented certain new and useful Improvements in Cameras; and I do hereby declare the following to be a full, clear, and exact description of the invention, such as will enable others skilled in the art to which it appertains to make and use the same.

In the use of hand cameras of the ordinary roll holding type, such as those using a roll of films, double exposure of a film sometimes results from failure of the operator to shift the film between the exposures. Similarly, if the operator forgets whether or not he has shifted the film after an exposure, and shifts it a second time, as a precaution against double exposure, there will be a blank film as the result.

It is the object of the present invention to safe-guard against these annoyances by locking the shutter mechanism of the camera after an exposure of the film, and keeping it locked until there has been a shift of the exposed film. The mechanism, furthermore, is so constructed that the operator can tell whether or not the shutter is locked, and so will know whether the film has been shifted, and will thereby be protected against making a double shift.

In the preferred embodiment hereinafter described, my invention is shown as applied to a camera of well known construction, but in its broader aspects, the invention is applicable in various ways and to cameras differing greatly in detail from that here described.

In the annexed drawings—

Figure 1 is a front elevation of a camera embodying my invention, with the front wall of the camera box removed to expose the working parts carried by the false front of the box, these parts being shown in the shutter locking position.

Fig. 2 is a similar view showing some of the parts in the unlocked position.

Fig. 3 is a fragmentary view of parts of the control mechanism.

Fig. 4 is a sectional plan view showing the film-winding key and the actuating means for the control mechanism.

Fig. 5 is an elevation of the base plate on which several of the parts are mounted.

Fig. 6 shows the back of the upper sliding bar and Fig. 7 the front thereof with its attached pawl.

Fig. 8 shows the front of the lower sliding bar.

Fig. 9 shows the back of one of the bearing blocks in which the bars of Figs. 7 and 8 are mounted to slide.

Fig. 10 is a plan view of the cams actuated by the film-winding key.

Fig. 11 is a perspective view of the push-bar, whereby the shutter mechanism can be set to give a time exposure instead of a snap-shot.

The camera of Fig. 1 comprises a box 1, having a false front 2 with a lens opening 3, and provided with usual accessories, including an oscillating shutter 4 pivoted at 5 and actuated through a spring 6 secured to lever 7 pivoted at 8 and operated by thumb piece 9. This shutter and its actuating mechanism, above described, is of a well known construction, and is adapted to give an instantaneous or snap-shot exposure of the film when the shutter opening 10 snaps past the lens opening 3.

As a means for locking the shutter mechanism after each film exposure, there is provided a plate 11 secured to lever 7, or made integral therewith, and shaped with shoulders at 12 and 13 to form stops whereby the shutter mechanism may be locked in closed position. In addition to these stops, the locking means comprises a detent in the form of a rock lever 14 pivoted at 15 and carrying a rearwardly extending stop pin 16, adapted to lie above stop 12 (or 13) when the shutter is locked, and to lie below this stop when the shutter is unlocked.

As a means for conveniently supporting this rock lever 14, and the associated elements hereinafter described, there may be provided a base plate 17 (Fig. 5) fastened to the wooden false front of the camera box, as by screws 18 and 19, though, if desired, this base plate may be dispensed with and the working parts mounted instead on the wooden front. A coil spring 20, encircling the pivot screw at 15, and having one end connected to the base plate, and the other end connected to rock lever 14, tends to normally throw the left hand end of this lever upward into locking position.

The locking means above described is provided with control mechanism, including a link 21 pivoted at 22 to rock lever 14, and also pivoted at 23 to a detent 24 mounted to swing about a stationary screw 25. Said control mechanism also includes a stop 26 on the side of and preferably integral with a bar 27 which is mounted to slide on base plate 17 and through guideways in bearing plates 28 and 29, which are rigidly secured to said base plate by suitable screws and dowel pins. This sliding bar 27 is provided with a coil spring 30 which has one end fastened to the base plate and the other end engaging a downwardly projecting pin on the sliding bar, said spring acting to slide the bar toward the shutter mechanism when the bar is not held against free movement.

It is by means of the above described control mechanism that the locking means for the shutter mechanism is automatically unlocked after an appropriate shifting of an exposed film, and as a means for actuating this control mechanism, there is provided a spring-pressed pawl 31 pivotally mounted at 32 on a sliding bar 33 (Fig. 7) which is at all times free to slide in guideways of bearing blocks 28 and 29, and is urged toward the left (Fig. 1) by a spring 34 secured to base plate 17. Mounted in the upper edge of this sliding bar 33 is a pin 33' which lies in the path of one end of a rock lever 35 (Fig. 4), the other end of which has a nose 36 lying in the path of one or more cams 37, operatively secured to the stem of the usual film winding key 38.

The film shifting mechanism, of which key 38 is a part, may be of the construction usual for winding up the film as fast as it has been exposed, and the key may have the usual movement into and out of engagement with the end of the winding spool and the usual friction clutch to prevent reverse rotation of the key. Leaf spring 34 holds nose 36 into operative engagement with the working faces of cams 37 to cause lever 35 to rock repeatedly on its pivot while an exposed film is being wound up, and thereby, through action on pin 33', cause bar 33 to slide backward and forward in its guides. Dog 31, carried by this sliding bar 33, is positioned to engage with a stop lug 40 on the lower bar 27, and has for its function the forward moving of that bar when the film is shifted, so that detent 24 may be caused to ride upward along the inclined face 41 (Fig. 8) of lug 26, and thereby pull upward on link 21 and swing rock lever 14 far enough to bring the center of stop pin 16 below stop 13. The relation of the parts will then be as shown in Fig. 2.

Detent 24 will then, under the action of spring 20, drop behind stop 26 to maintain the shutter mechanism in unlocked condition. Any further winding movement at the film winding key 38 will merely cause pawl 31 to slide back and forth into and out of engagement with stop 40, but without disturbing the unlocked condition of the shutter mechanism.

Between stops 12 and 13 of the shutter mechanism are a pair of inclined cam surfaces 42 and 43 adapted for engagement with pin 16. With the apparatus in the position illustrated by Fig. 2, a swinging movement of thumb piece 9 will cause the shutter to open and expose the film, and at the same time will bring cam face 43 against pin 16 and cause that pin to move downward, thereby rocking lever 14 and producing an upward movement of link 21. The upper end of that link is adapted to lift pawl 31 simultaneously with the lifting of detent 24, so that as soon as that detent is high enough to clear stop 26, the pawl 31 will be out of the path of stop 40 and bar 27 will be free to slide to the left under the action of its spring 30 and assume the position illustrated in Fig. 1, and the shutter mechanism will thereby be locked against movement until after further manipulation of the film winding key 38. With the shutter mechanism locked, as shown in Fig. 1, the rigidity of thumb piece 9 will indicate to the user whether the shutter is or is not locked, and if it has become locked through a preceding operation of the shutter, it can be unlocked, as above described, by suitable turning of the film winding key.

For taking time exposures, it is sometimes desirable to be able to throw the shutter-locking mechanism out of action and leave the shutter wholly unlocked, and for this purpose I have provided a step 44 detachably secured to the push bar 45 of the mechanism for controlling the time stop 46. With this stop in position, as shown in Figs. 1 and 11, an upward pull on bar 45 to set the shutter time stop in usual manner, will bring the step into engagement with rock lever 14, thereby lifting its associated detent 24 and dog 31 out of engagement with their stops, and at the same time swinging stop pin 16 clear of stops 12 or 13. As soon, however, as the push bar 45 is again pushed down, the shutter mechanism will again be locked.

Although I have described my invention in conjunction with a camera having film shifting mechanism and shutter mechanism of a well known type, I am aware that various changes in details can be made and the improvement adapted by those skilled in the art, to cameras differing in many respects from that here illustrated.

I claim:—

1. In a roll holding camera, the combination with a shutter, a swinging operating lever therefor having two positions of rest, and film shifting mechanism, of automatic locking mechanism for locking the shutter against a second exposure of the same film, comprising a rocking lever constructed and arranged to engage with and to be disengaged from the operating lever in either of its positions of rest, and control mechanism coöperative with the rocking lever and with the film shifting mechanism, said control mechanism being released to lock said levers in engagement when the operating lever is swung from one to another position of rest to expose the film, and being automatically moved by the film shifting mechanism to disengage the said levers when the film is shifted for the next exposure.

2. In a roll holding camera, the combination with a shutter, a swinging operating lever therefor having two positions of rest, and film shifting mechanism, of automatic locking mechanism for locking the shutter against a second exposure of the same film, comprising a member carried by the operating lever and having locking stops and operating cams, a rocking lever coöperative with the locking stops and operating cams, and control mechanism coöperative with the rocking lever and with the film shifting mechanism, said control mechanism being released by the rocking lever to engage it with the locking stops when an operating cam actuates the rocking lever in swinging with the operating lever from one to another position of rest to expose the film, and being automatically moved by the film shifting mechanism to disengage said lever when the film is shifted for the next exposure.

3. In a roll holding camera, the combination with a shutter, a swinging operating lever therefor having two positions of rest, and film shifting mechanism, of automatic locking mechanism for locking the shutter against a second exposure of the same film, comprising a rocking lever constructed and arranged to engage with and to be disengaged from the operating lever in either of its positions of rest, and control mechanism including a swinging pawl coöperative with the rocking lever and with the film shifting mechanism, said pawl being moved to a position in which said levers are locked in engagement when the operating lever is swung from one to another position of rest to expose the film, and being automatically operated by the film shifting mechanism to disengage said levers when the film is shifted for the next exposure.

4. In a roll holding camera, the combination with a shutter, a swinging operating lever therefor having two positions of rest, and film shifting mechanism, of automatic locking mechanism for locking the shutter against a second exposure of the same film, comprising a rocking lever constructed and arranged to engage with and to be disengaged from the operating lever in either of its positions of rest, and control mechanism coöperative with the rocking lever and with the film shifting mechanism and including a sliding bar, and a push pawl coöperative therewith, said sliding bar having one position in which said levers are locked in engagement when the operating lever is swung from one to another position of rest to expose the film, and another position in which said levers are disengaged when the film has been shifted for the next exposure.

5. In a roll holding camera, the combination with a shutter, a swinging operating lever therefor having two positions of rest, and film shifting mechanism, of automatic locking mechanism for locking the shutter against a second exposure of the same film, comprising a rocking lever constructed and arranged to engage with and to be disengaged from the operating lever in either of its positions of rest, and control mechanism including a swinging pawl connected to the rocking lever, a spring-pressed sliding bar determining the position of the swinging pawl, and a push pawl coöperative with the film shifting mechanism and with the sliding bar, said sliding bar being released by the swinging pawl upon actuation thereof by the rocking lever to lock said levers in engagement when the operating lever is swung from one to another position of rest to expose the film, and being moved by the film shifting mechanism to disengage said levers when the film is shifted for the next exposure.

6. In a camera having a shutter and mechanism for operating the same, and having a key for winding a film roll past said shutter, the combination of a cam turning with said key, a lever rocked by said cam, a pawl moved by said lever, a pair of stops moved by said pawl, a detent adapted to engage with one of said stops, and a rock lever operatively connected with said detent, said lever being adapted to lock said shutter mechanism against movement except when said detent is in engagement with its said stop; substantially as described.

7. In a roll holding camera, the combination with a shutter, a swinging operating lever therefor having two positions of rest, and film shifting mechanism, of automatic locking mechanism for locking the shutter against a second exposure of the same film, comprising a rocking lever constructed and arranged to engage with and to be disengaged from the operating lever in both positions of rest, control mechanism coöperative with the rocking lever and with the film shifting mechanism to lock said lever in engagement when the operating lever is swung from one to another position of rest to expose the film and to disengage said levers when the film is shifted for the next exposure, and a release bar coöperative with the rocking lever to hold it disengaged from the operating lever when the shutter is set for a time exposure.

In testimony whereof I affix my signature.

GEORGE A. GOODSON.

---

It is hereby certified that in Letters Patent No. 1,241,843, granted October 2, 1917, upon the application of George A. Goodson, of New York, N. Y., for an improvement in "Cameras," an error appears in the printed specification requiring correction as follows: Page 4, line 5, claim 7, for the word "both" read *either of its;* and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 95—31.